US006886416B2

(12) United States Patent
Tsay et al.

(10) Patent No.: US 6,886,416 B2
(45) Date of Patent: May 3, 2005

(54) PEDAL FORCE SENSING APPARATUS FOR AN ELECTRIC BICYCLE

(75) Inventors: Kwei-Chi Tsay, No. 10-1, Alley 94 Lane 211, Jhongsing Rd., Longtan Township 325 (TW); Cheng-Chung Houng, 1F, No. 3, Lane 99, Pu-Ding Road, Hsinchu 300 (TW)

(73) Assignees: Transceiving System Technology Corp., Hsinchu (TW); Jui Lin Chen, Hsinchu (TW); Kwei-Chi Tsay, Longtan Township (TW); Cheng-Chung Houng, Dasi Township (TW)

( * ) Notice: Subject to any disclaimer, the term of this patent is extended or adjusted under 35 U.S.C. 154(b) by 0 days.

(21) Appl. No.: 10/708,954

(22) Filed: Apr. 2, 2004

(65) Prior Publication Data
US 2004/0200294 A1 Oct. 14, 2004

(30) Foreign Application Priority Data
Apr. 10, 2003 (CN) .................................... 03245201 U

(51) Int. Cl.⁷ ............................................... G01L 3/02
(52) U.S. Cl. .............................. 73/862.321; 73/862.322
(58) Field of Search ................... 73/862.322, 862.31, 73/862.08, 862.321

(56) References Cited

U.S. PATENT DOCUMENTS 6,161,452 A * 12/2000 Hilber ........................ 74/594.1
6,418,797 B1 * 7/2002 Ambrosina et al. ...... 73/862.29

* cited by examiner

Primary Examiner—Edward Lefkowitz
Assistant Examiner—Lilybett Martir
(74) Attorney, Agent, or Firm—Connolly Bove Lodge & Hutz LLP; Larry J. Hume

(57) ABSTRACT

A pedal force sensing apparatus includes a pedal force input shaft, a force action sleeve, a torque output shaft, at least one elastomer, a micro optical pickup head module, a diversion sleeve, a linear sliding bush and a displacement sensor. The pedal force input shaft to which an input torque is applied drives the force action sleeve combined with it to simultaneously rotate. Sequentially, the force action sleeve applies forces to the elastomer to have reaction force acting on the torque output shaft. When a reverse torque from the loading of the electric bicycle is applied to the opposite end of the torque output shaft, the rotations of the torque output shaft and the force action sleeve occur, and relative angular displacement between them simultaneously exists.

13 Claims, 5 Drawing Sheets

PEDAL FORCE SENSING APPARATUS FOR AN ELECTRIC BICYCLE

BACKGROUND

The present invention relates to a pedal force sensing apparatus for an electric bicycle, especially to an apparatus capable of sensing the pedal force of an electrical bicycle for driving an electrical motor to output an adequate auxiliary force during biking.

The power transmission mechanism of a conventional electric bicycle generally comprises a high-speed electric motor as an auxiliary power source to help a cyclist overcome a road rough for biking. A gear reduction mechanism reduces the output speed of the motor so as to accordingly increase the output torque. The power from the motor after speed reduction and the pedaling power from the cyclist are coupled together by a power combining mechanism, and subsequently are transmitted to a chain wheel for driving the electric bicycle forward at a labor-saving mode.

In order to accommodate the output power of the motor to a road of variable conditions, a pedal force sensing apparatus is provided on a pedal transmission path to detect the magnitude of the pedal force to thereby adjust the output force of the motor for saving the applied force from cyclist.

Conventional electric bicycles with pedal force sensing function are categorized into two types. In one of the types, the electric bicycle is simply controlled by a switch. When the pedal force is larger or smaller than a threshold value, the power of the motor is turned on or turned off by the switch. In the other type, a pedal force sensing apparatus can detect the magnitude of the pedal force, and the output power of the motor is depended on the sensed pedal force. If the output power of the motor is only controlled by the switch, there is not a flexible auxiliary force to satisfy the bicyclist. On the other hand, the conventional pedal force sensing apparatus generally employs a set of complicated planetary bevel gears to have a different action, and a relative angular displacement occurred in the different action is transferred to a sensed pedal force. Regarding the aforesaid pedal force sensing apparatus, several advanced companies worldwide, e.g., Japanese YAMAHA Co. and Japanese HONDA Co., currently provide an electric bicycle with this function. However, the electric bicycle has a high cost and a quite complicated mechanism including a great deal of transmission parts.

In summary, it is an important issue for the electric bicycle industry regarding how to provide a pedal force sensing apparatus with an uncomplicated structure so as to reduce the manufacturing cost of the electric bicycle.

BRIEF SUMMARY

The first objective of the present invention is to provide a pedal force sensing apparatus with an uncomplicated structure to directly detect the pedal force applied by the bicyclist of an electric bicycle so as to minimize the variation of the detection caused by the wear between multi-levels power transmission parts.

The second objective of the present invention is to provide a sensing apparatus having a linear output in response to the magnitude of the pedal force. The control system of the motor can be simplified due to the linear output of a signal.

In order to achieve these objectives, the present invention discloses a pedal force sensing apparatus comprising a pedal force input shaft, a force action sleeve, a torque output shaft, at least one elastomer, a micro optical pickup head module, a diversion sleeve, a linear sliding bush and a displacement sensor. The pedal force input shaft to which an input torque is applied drives the force action sleeve combined with it to simultaneously rotate. Sequentially, the force action sleeve applies forces to the elastomer to have reaction force acting on the torque output shaft. When a reverse torque from the loading of the electric bicycle is applied to the opposite end of the torque output shaft, the rotations of the torque output shaft and the force action sleeve occur, and relative angular displacement between them simultaneously exists. Because the constraint relation exists between the first guiding pin of the force action sleeve and the spiral slot of the diversion sleeve, the first guiding pin has a push force acting on the diversion sleeve along the axial direction. On the other hand, the second guiding pin of the diversion sleeve slides along the leading groove of the torque output shaft, and therefore the relative angular movement does not exist between them. After the axial push forces from the first guiding pin acts on the diversion sleeve, the diversion sleeve has a linear displacement along the axial direction. The diversion sleeve and linear sliding bush only have the conjunction of axial movement, hence the linear sliding bush has the same axial displacement for the displacement sensor to detect the magnitude of the pedal force.

DESCRIPTION OF THE DRAWINGS

The invention will be described according to the appended drawings in which.

DETAILED DESCRIPTION

Figure 1:
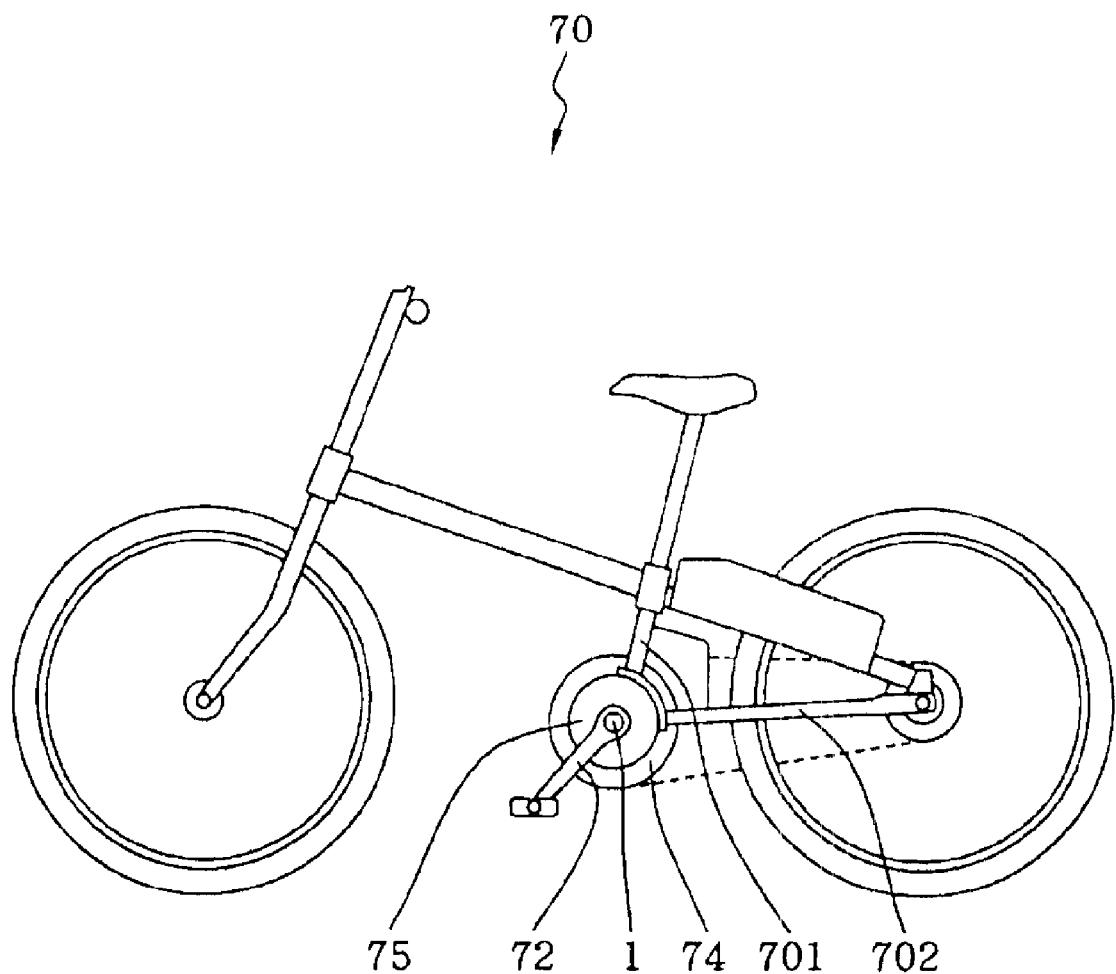
FIG. 1 is a schematic diagram of the combination of a pedal force sensing apparatus and an electric bicycle in accordance with the present invention.

FIG. 1 is a schematic diagram of the combination of a pedal force sensing apparatus and an electric bicycle in accordance with the present invention. A pedal force sensing apparatus 75 is mounted between a seat tube 701 and a chain stay 702 of the electric bicycle 70. A pedal force input shaft 1 passes through the pedal force sensing apparatus 75, and is combined with pedal cranks 72 and a chain wheel 74.

Figure 2:
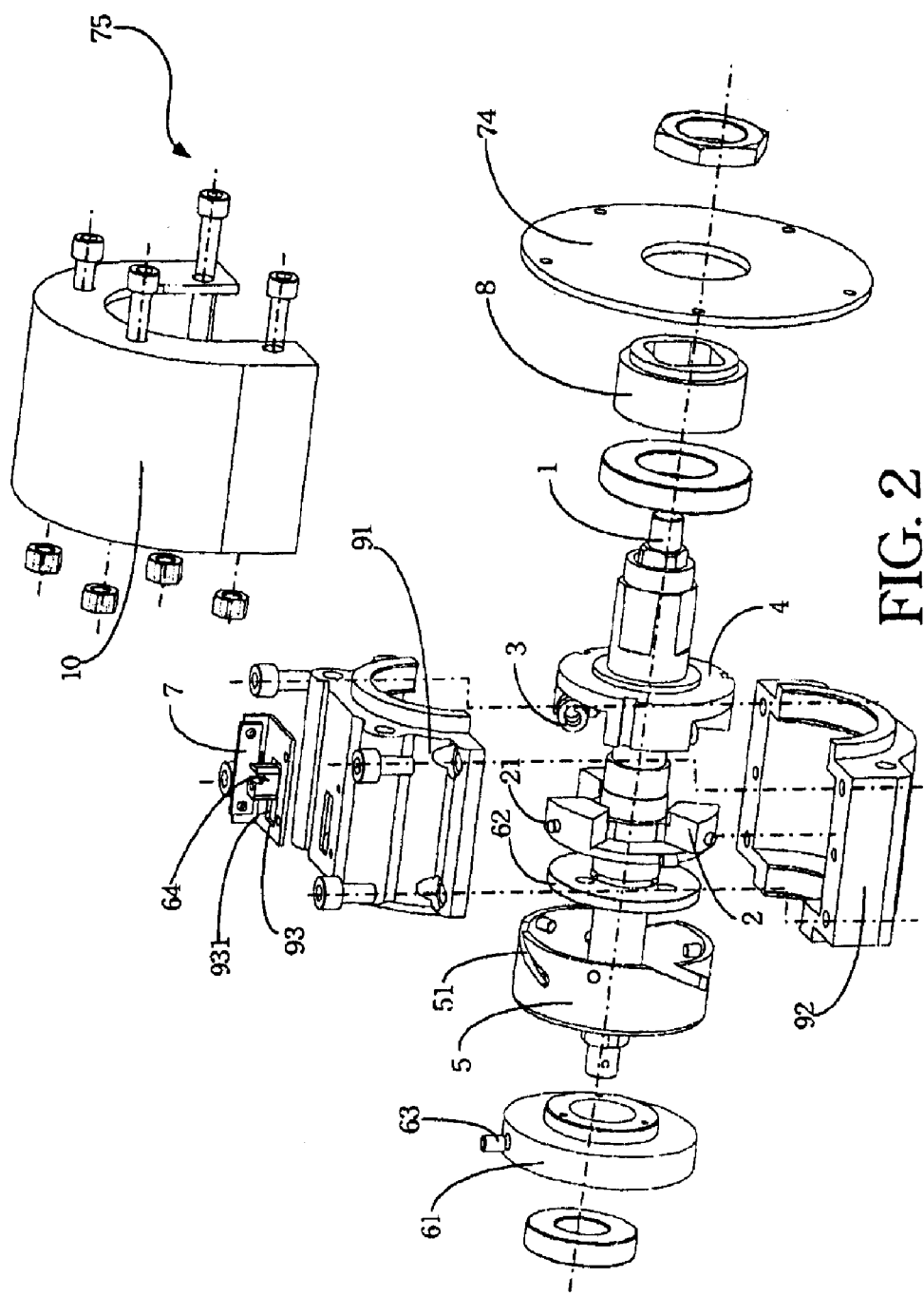
FIG. 2 is an exploded diagram of the pedal force sensing apparatus in accordance with the present invention.

As shown in FIG. 2, there is an exploded diagram of the pedal force sensing apparatus in accordance with the present invention, wherein the pedal force input shaft 1 passes through the center of the chain wheel 74 and the main frame of the pedal force sensing apparatus 75. A casing 10 is mounted on the exterior of the pedal force sensing apparatus 75, and acts as a holding interface on the structure of the electric bicycle 70. An upper mechanism housing 91 and a lower mechanism housing 92 are vertically aligned, and together fixed on the inner of the casing 10. A displacement sensor 7 is screwed onto a connection bracket 93, and senses the displacement of the displacement flag 64 sliding along a long slot 931. We can take a liner displacement meter generally used as the displacement sensor 7 for changing linear displacement into an electrical signal.

The upper mechanism housing 91 and lower mechanism housing 92 enclose a linear sliding bush 61, a diversion sleeve 5, a force action sleeve 2 a plurality of elastomers 3 and a torque output shaft 4. The linear sliding bush 61 is fastened on the lock ring 62, and allows the diversion sleeve 5 to synchronously move along the axial direction of the pedal force input shaft 1. An extension rod 63 mounted on the linear sliding bush 61 is placed in the inner of the displacement flag 64. In addition, an output shaft sleeve 8 mounted on the end of the torque output shaft 4 extending from the interior of the upper mechanism housing 91, and drives the chain wheel 74 to transfer pedal force to a chain as so to advance the electric bicycle 70.

Figure 3:
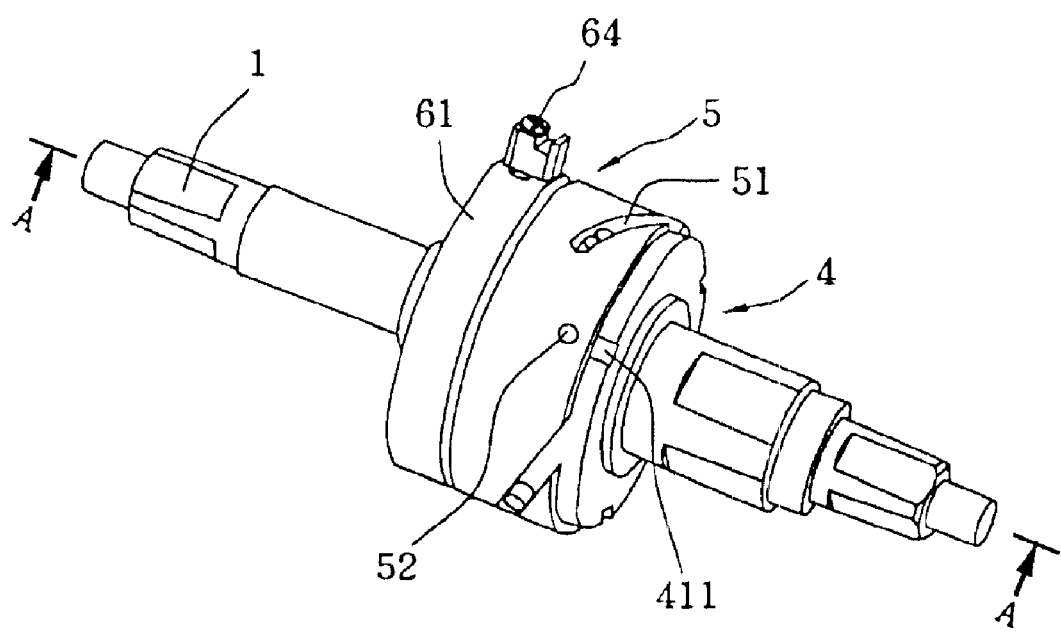
FIG. 3 is an assembly diagram of the core mechanism of the pedal force sensing apparatus in accordance with the present invention.

FIG. 3 is an assembly diagram of the core mechanism of the pedal force sensing apparatus in accordance with the present invention. There are a plurality of leading grooves 411 formed on the torque output shaft 4. A second guiding pin 52 on the diversion sleeve 5 slides along the corresponding one of the leading grooves 411, and therefore the diversion sleeve 5 and torque output shaft 4 synchronously rotate along the same rotation axis aligned with the axis of the pedal force input shaft 1, but they have independent linear movement along the axial direction.

Figure 4:
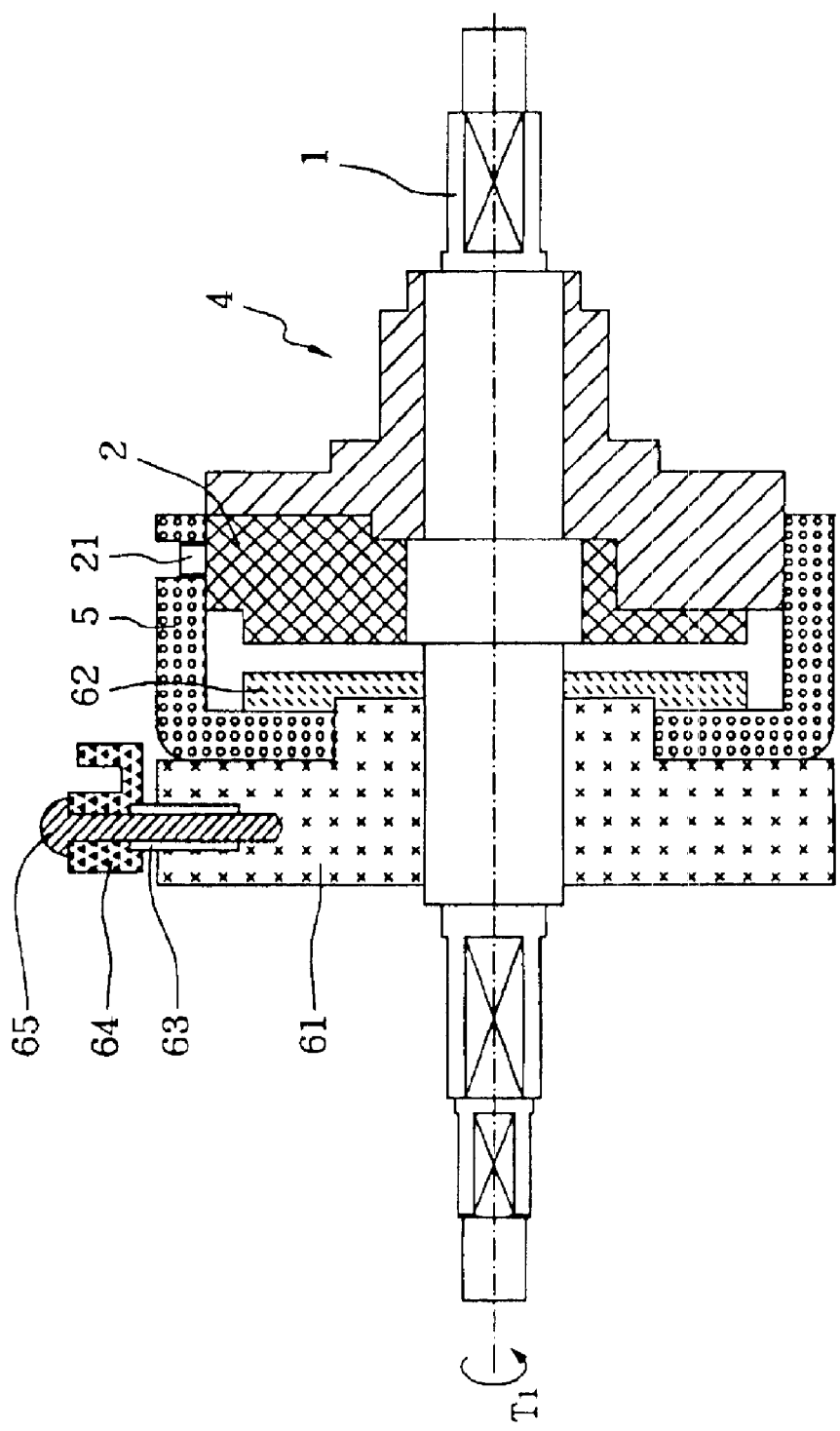
FIG. 4 is a cross-sectional diagram taken along the line 1□1 in FIG. 3.

FIG. 4 clear shows the theorem of a movement in accordance with the present invention, and is a cross-sectional diagram taken along the line 1□1 in FIG. 3. Only the force action sleeve 2 is firmly combined with the pedal force input shaft 1 together. In contrast with the force action sleeve 2, the relative angular displacement between the torque output shaft 4 and pedal force input shaft 1 might exist, but the relative linear displacement between them is nonexistent by a constraint relation. Furthermore, the linear sliding bush 61 is allowed to slide along the axis of the pedal force input shaft 1. Because the displacement flag 64 mounted on the linear sliding bush 61 is constrained by the long slot 931, the linear sliding bush 61 cannot rotate around the pedal force input shaft 1. A fastening 65 is employed to screw the displacement flag 64 and extension rod 63 to the linear sliding bush 61.

Figure 5:
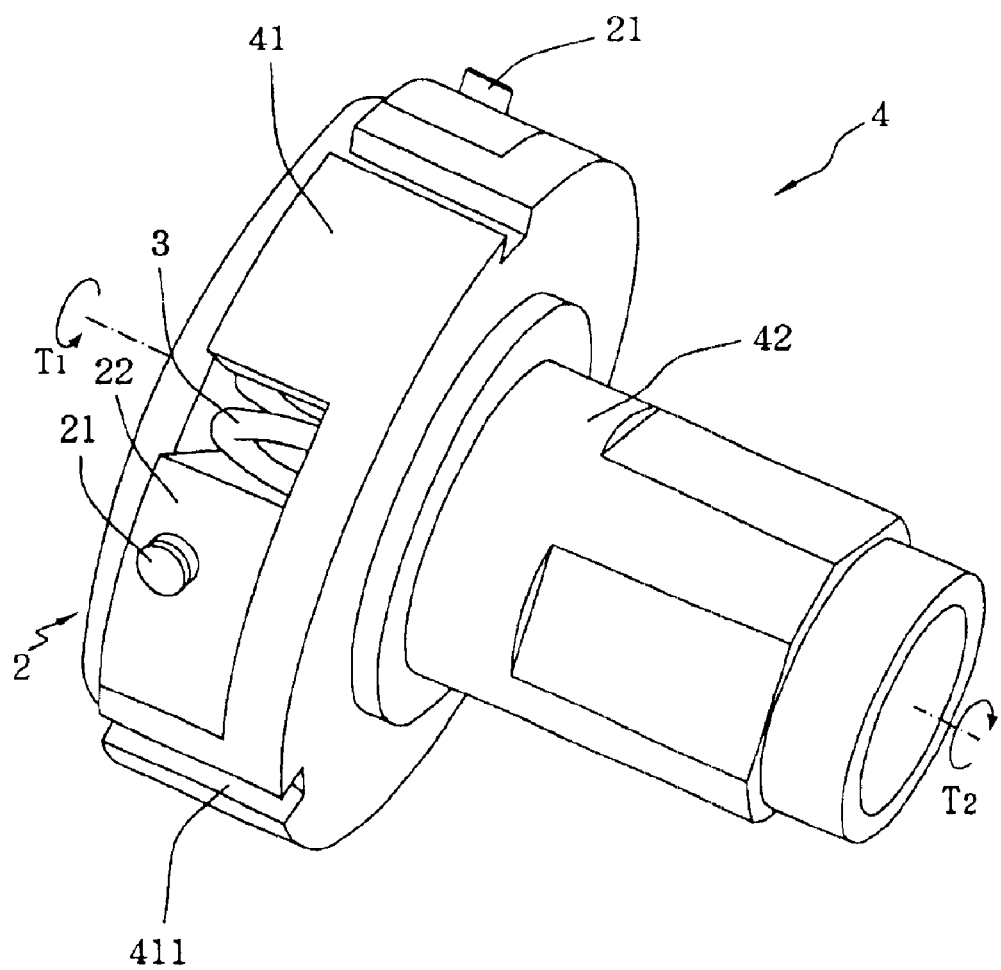
FIG. 5 is a perspective diagram showing the relative positions between a force action sleeve and a torque output shaft in accordance with the present invention.

When an input torque $T_1$ is applied to the pedal force input shaft 1, the force action sleeve 2 is driven to simultaneously rotate. Sequentially, the force action sleeve 2 applies forces to the elastomers 3 to have reaction force acting on the torque output shaft 4, as show in FIG. 5. The several elastomers 3 are separately placed in the space between one of the flanges 22 of the force action sleeve 2 and one of the grip teeth 41 of the torque output shaft 4. A compression spring is a preferable elastomer.

If a reverse torque $T_2$ whose magnitude is larger than the magnitude of the input torque $T_1$ is applied to the output end 42 of the torque output shaft 4, the rotations of the torque output shaft 4 and the force action sleeve 2 occur, and relative angular displacement between them exists. Because the constraint relation exists between the first guiding pin 21 of the force action sleeve 2 and the spiral slot 51 of the diversion sleeve 5, the first guiding pin 21 has a push force acting on the diversion sleeve 5 along the axial direction. On the other hand, the second guiding pin 52 of the diversion sleeve 5 slides along the leading groove 411 of the torque output shaft 4, and therefore the relative angular movement does not exist between them. After the axial push forces from the first guiding pin 21 act on the diversion sleeve 5, the diversion sleeve 5 has a linear displacement along the axial direction. The diversion sleeve 5 and linear sliding bush 61 only have the conjunction of axial movement, hence the linear sliding bush 61 has the same axial displacement for the displacement sensor 7 to detect the magnitude of the pedal force.

The above-described embodiments of the present invention are intended to be illustrative only. Numerous alternative embodiments may be devised by persons skilled in the art without departing from the scope of the following claims.

We claim:

1. A pedal force sensing apparatus for an electric bicycle, comprising:
   a pedal force input shaft whose center line is designated as an axial direction;
   a torque output shaft mounted around the pedal force input shaft and including at least one leading groove;
   a force action sleeve mounted around and fixed on the pedal force input shaft and including at least one first guiding pin;
   at least one elastomer whose two ends separately contact the force action sleeve and torque output shaft for transferring torque from the force action sleeve to the torque output shaft, wherein an elastic deformation is formed by a relative angular displacement between the torque output shaft and the force action sleeve;
   a diversion sleeve including at least one spiral slot and at least one second guiding pin, wherein a relative axial direction displacement and a relative angular displacement exist between the spiral slot and first guiding pin, and a relative axial direction displacement exists between the leading groove and the second guiding pin;
   a linear sliding bush mounted on the pedal force input shaft and sliding along the axial direction in synchronous relation with the diversion sleeve; and
   a displacement sensor for sensing the axial direction displacement of the linear sliding bush.

2. The pedal force sensing apparatus for an electric bicycle of claim 1, wherein no relative axial direction displacement exists between the pedal force input shaft and torque output shaft, and no angular displacement exists between the pedal force input shaft and linear sliding bush.

3. The pedal force sensing apparatus for an electric bicycle of claim 1, further comprising a mechanism housing for acting as a cover for the pedal force sensing apparatus.

4. The pedal force sensing apparatus for an electric bicycle of claim 3, wherein the displacement sensor is placed in a long slot on the mechanism housing.

5. The pedal force sensing apparatus for an electric bicycle of claim 1, wherein the linear sliding bush includes a displacement flag standing on the surface of the linear sliding bush.

6. The pedal force sensing apparatus for an electric bicycle of claim 5, wherein the displacement flag has an axial displacement.

7. The pedal force sensing apparatus for an electric bicycle of claim 1, wherein the torque output shaft includes at least one griping tooth and an output end.

8. The pedal force sensing apparatus for an electric bicycle of claim 7, wherein the griping tooth is engaged with the force action sleeve through the elastomer.

9. The pedal force sensing apparatus for an electric bicycle of claim 7, wherein an output shaft sleeve is mounted around the output end and combined with a chain wheel.

10. The pedal force sensing apparatus for an electric bicycle of claim 1, wherein the elastomer is a spring.

11. The pedal force sensing apparatus for an electric bicycle of claim 1, wherein the displacement sensor is a linear displacement meter.

12. The pedal force sensing apparatus for an electric bicycle of claim 3, further comprising a casing enclosing the mechanism housing for fixing the pedal force sensing apparatus on the electric bicycle.

13. The pedal force sensing apparatus for an electric bicycle of claim 1, wherein an end of the pedal force input shaft is combined with a crank included in the electric bicycle.

* * * * *